(12) United States Patent
Wang

(10) Patent No.: US 7,899,622 B2
(45) Date of Patent: Mar. 1, 2011

(54) SEQUENTIAL RESISTIVITY IMAGING WITH ASYMMETRIC ELECTRODE ARRAYS

(75) Inventor: Tsili Wang, Katy, TX (US)

(73) Assignee: Baker Hughes Incorporated, Houston, TX (US)

( * ) Notice: Subject to any disclaimer, the term of this patent is extended or adjusted under 35 U.S.C. 154(b) by 191 days.

(21) Appl. No.: 12/202,491

(22) Filed: Sep. 2, 2008

(65) Prior Publication Data
US 2009/0309602 A1 Dec. 17, 2009

Related U.S. Application Data

(60) Provisional application No. 61/061,302, filed on Jun. 13, 2008.

(51) Int. Cl.
*G01V 1/40* (2006.01)
(52) U.S. Cl. ........... 702/7; 702/9; 702/11; 702/61; 702/64; 430/122.52; 324/367; 324/374; 73/760
(58) Field of Classification Search ........... 73/760; 324/367, 374; 430/122.52; 702/7, 9, 11, 702/61, 64
See application file for complete search history.

(56) References Cited

U.S. PATENT DOCUMENTS

| 6,405,136 | B1 * | 6/2002 | Li et al. ............ 702/10 |
|---|---|---|---|
| 7,066,822 | B2 | 6/2006 | Cochron |
| 7,558,675 | B2 * | 7/2009 | Sugiura ............ 702/9 |
| 7,659,722 | B2 * | 2/2010 | Bittar ............ 324/337 |
| 2004/0051531 | A1 * | 3/2004 | Chemali et al. ............ 324/367 |

OTHER PUBLICATIONS

Schima et al., "Monitoring Air Sparging Using Resistivity Tomography", 1996, NGWA Publication, pp. 131-138.*
Itskovich, et al. "Single-Dipole High Frequency Electric Imager". U.S. Appl. No. 11/758,875, filed Jun. 6, 2007.

* cited by examiner

*Primary Examiner*—Eliseo Ramos Feliciano
*Assistant Examiner*—Elias Desta
(74) *Attorney, Agent, or Firm*—Cantor Colburn LLP

(57) ABSTRACT

A method and instrument provide a very detailed symmetric resistivity image of a formation. A first asymmetric resistivity image is collected from a first arrangement of electrodes, which form an asymmetric sensor. A second asymmetric resistivity image is collected from a second arrangement of electrodes, which form an asymmetric sensor. The first image and the second image overlap each other. The images are assembled about a selected reference point and then processed to provide the very detailed symmetric resistivity image.

21 Claims, 5 Drawing Sheets

-- PRIOR ART --

SEQUENTIAL RESISTIVITY IMAGING WITH ASYMMETRIC ELECTRODE ARRAYS

CROSS REFERENCE TO RELATED APPLICATIONS

The present application is filed under 37 CFR §1.53(b) and 35 U.S.C. §120 and claims priority to U.S. Provisional Patent Application Ser. No. 61/061,302, filed Jun. 13, 2008, the entire contents of which are specifically incorporated herein by reference in their entirety

BACKGROUND OF THE INVENTION

1. Field of the Invention

The invention disclosed herein relates to subterranean imaging and, in particular, to arrangements of electrodes for resistivity imaging within a wellbore.

2. Description of the Related Art

Imaging of formations surrounding boreholes provides valuable information for describing geologic features. Some of the features include structural framework, fracture patterns, sedimentary feature, and in-situ stress orientation. High-resolution borehole images are used as an aid in providing conventional core description and determining orientation. While various technologies are used for imaging, one technology that is particularly useful involves resistivity measurements.

Information obtained by performing resistivity measurements is useful for planning formation testing, sampling, perforating and other such tasks. An exemplary instrument for making resistivity measurements is available from Baker Hughes, Incorporated of Houston, Tex. The instrument, referred to as an "Earth Imager," has provided for a variety of resistivity images.

With regard to the exemplary instrument, reference may be had to FIG. 1. In FIG. 1, there is shown a depiction of the prior art instrument for performing resistivity imaging. In this example, the instrument 21 is disposed within a wellbore 11 (also referred to as a "borehole"). The instrument 21 includes pads 3 mounted on articulating arms 2. The articulated pads 3 are typically pressed up against a wall of the wellbore 11 and make firm contact therewith. Current I flows from at least one transmitter electrode 6 on the pad 3 to the return electrode 4. The return electrode 4 is electrically separated from each transmitter electrode 6 by an insulator 5. The current I is typically alternating current (AC). Accordingly, it is recognized that the current I actually flows in two directions as polarity changes.

Other arrangements of electrodes may be used. For example, a sensor may additionally include sensor electrodes, focusing electrodes, and other such electrodes.

During operation of the instrument, current measurement for each combination of the return electrode 4 and the transmitter electrode 6 is a function of the formation conductivity and the voltage applied. High resolution images are achieved by sampling at a high rate (for example, about 120 samples per foot).

While this instrument produces valuable data, one skilled in the art of data interpretation may recognize certain limitations. Accordingly, a variety of combinations and relationships are known for providing a sensor having a combination of the return electrode 4 and at least one transmitter electrode 6. Some of these embodiments include ones having the return electrode 4 on the pad 3 in a close relationship to the transmitter electrode 6.

Resistivity images taken within a borehole may be acquired with a one-side transmitter. That is, current emitted from a transmitter electrode will flow to one or return electrodes located on one side of the sensor. As a result, an image can appear asymmetric over a symmetric feature. For imaging devices operating in conductive muds, the return electrode 4 is usually located above the transmitter electrodes 6 mounted on several pads 3 (as shown in FIG. 1). However, because of the great relative distance between electrodes, the asymmetry is often not significant. For non-conductive mud imaging, transmitter electrodes 6 and return electrodes 4 may need to be placed close to each other, such as both being "on pad." In embodiments of sensors having on pad transmitter electrode(s) and return electrode(s), the image response will be significantly asymmetric because of the proximity of the transmitter electrode to the return electrode.

Such is the case regardless of whether the transmitter electrode 6 is located above or below the return electrode 4. Symmetric images may be obtained with symmetric transmitter electrodes placed on the opposite sides of return electrodes and activated simultaneously to receive current emitted from the return electrodes.

Therefore, what are needed are methods and apparatus for obtaining symmetric images through imaging with asymmetric arrangements of electrodes.

BRIEF SUMMARY OF THE INVENTION

One embodiment of the invention includes a method for providing a symmetric resistivity image of a formation using at least one asymmetric sensor, the method including: collecting a plurality of resistivity images, each of the images collected from the at least one asymmetric sensor disposed on a pad; assembling the plurality of resistivity images about a selected reference point; and processing the plurality of resistivity images to provide a symmetric image of the formation.

Another embodiment of the invention includes a computer program product including machine readable and executable instructions stored on machine readable media, the instructions for providing a symmetric resistivity image of a formation using at least one asymmetric sensor by implementing a method including: collecting a plurality of resistivity images, each of the images collected from the at least one asymmetric sensor; assembling the plurality of resistivity images about a selected reference point; and processing the plurality of resistivity images to provide a symmetric image of the formation.

A further embodiment of the invention includes a instrument for imaging an earth formation, the instrument including: a computer program product including machine readable and executable instructions stored on machine readable media, the instructions for providing a symmetric resistivity image of a formation using at least one asymmetric sensor disposed on a pad by implementing a method including: collecting a plurality of resistivity images, each of the images collected from the at least one asymmetric sensor; assembling the plurality of resistivity images about a selected reference point; and processing the plurality of resistivity images to provide a symmetric image of the formation; and, at least one processor for executing the computer program product and controlling the asymmetric sensor.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Disclosed are techniques for generating symmetric resistivity images of subterranean materials from asymmetric arrangements of electrodes in a resistivity instrument. Disclosed herein are alternative approaches for obtaining symmetric images without the use of symmetric transmitter electrodes. The embodiments provided include those where electrodes are activated simultaneously. The approaches provided use asymmetric arrangements of transmitter electrodes and return electrodes. Asymmetric images are sequentially acquired with the electrode arrangements. The asymmetric images are then combined to form symmetric images. As an example, asymmetric electrode arrangements can be formed by placing a transmitter electrode either above or below a row of return electrodes, by using a single set of dual-function electrodes, or by other similar techniques and embodiments.

As an example, a (larger) transmitter electrode may be partitioned into smaller electrodes placed next to a row of separate return electrodes. When current is emitted from the return electrodes, the row of transmitter electrodes serve as sensing electrodes. Similarly, when the transmitter electrodes serve as current emission electrodes, the return electrodes serve as the sensing electrodes.

Accordingly, it should be recognized that the terms "return electrode," "transmitter electrode," "sensor electrode" and other such terms may be interchangeable when operational. That is, for example, as alternating current (AC) cycles between positive and negative, each of the return electrodes and the transmitter electrodes may change in function. Accordingly, in at least some instances, such terminology is arbitrary or with reference to a given instant in time, and without regard to dynamics involved in performing measurements. Thus, embodiments provided are merely illustrative and are not limiting of the invention.

Figure 1:
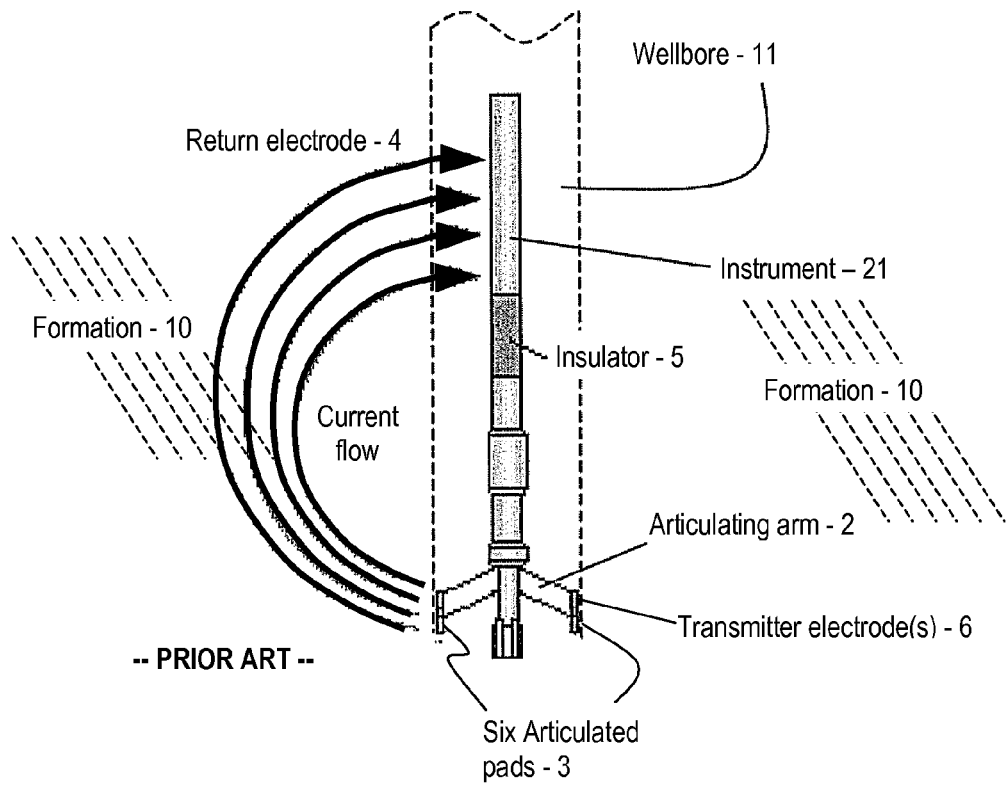
FIG. 1 is a illustration of a prior art device for conducting resistivity imaging.
Figure 2:
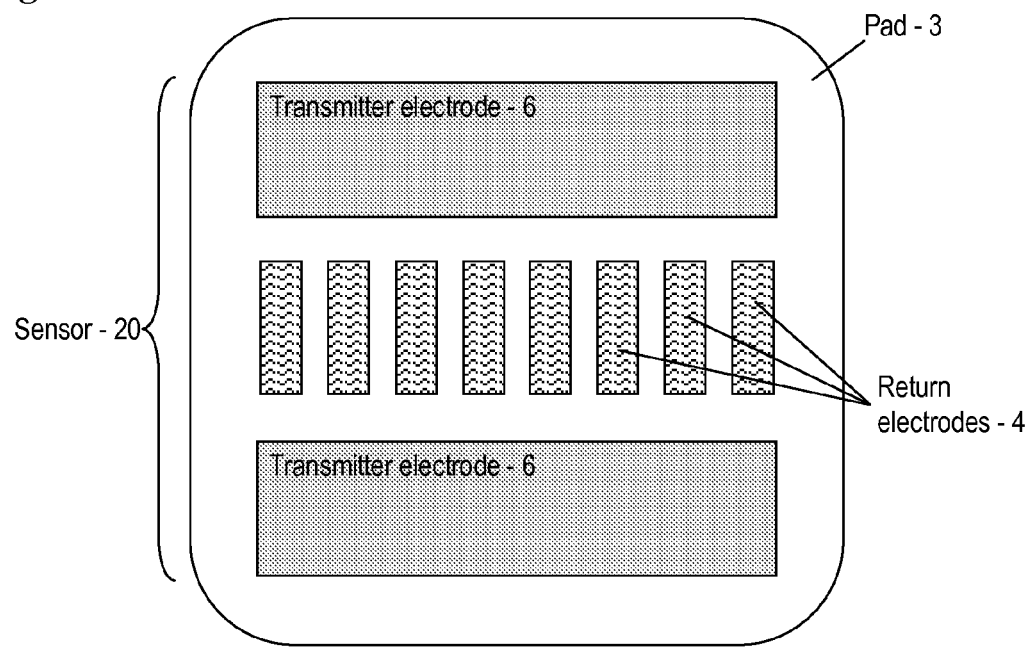
FIGS. 2-5 depicts aspects of embodiments of a sensor disposed on a pad.

A symmetric image can be obtained with symmetric transmitter electrodes, as illustrated in FIG. 2. In this example, two transmitter electrodes 6 are disposed on a pad 3. The transmitter electrodes 6 work in combination with a plurality of return electrodes 4 to provide a sensor 20. In this example, the transmitter electrodes 6 are disposed symmetrically on the opposite sides of the return electrodes 4. In operation, both transmitter electrodes 6 are activated simultaneously. Electric current, I, is emitted from the return electrodes 4 and returned to the transmitter electrodes 6 simultaneously. Current, I, emitted from each return electrode 4 is measured to reflect the formation resistivity next to the electrode. It should be recognized that the image response will be symmetric (i.e., the image acquired over a symmetric feature will appear symmetric). Other embodiments may be used as well.

Figure 3:
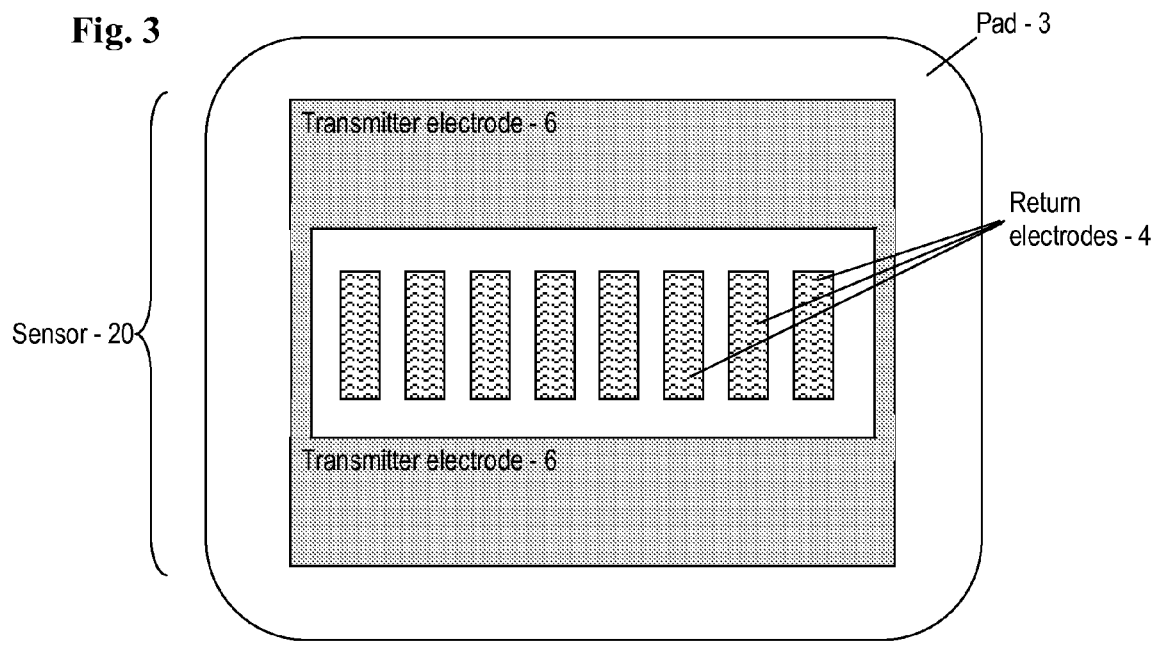

Consider an embodiment where the two transmitter electrodes 6 are physically combined into a single transmitter electrode 6, as shown in FIG. 3. In this example, the transmitter electrode 6 has a single metal surface exposed to mud within a wellbore. In FIG. 3, a single transmitter electrode 6 is placed symmetrically around the return electrodes 4. Again, an image response will be symmetric. For the illustration purposes only, the single transmitter electrode 6 forms a closed surface around the return electrodes 4.

Figure 4:
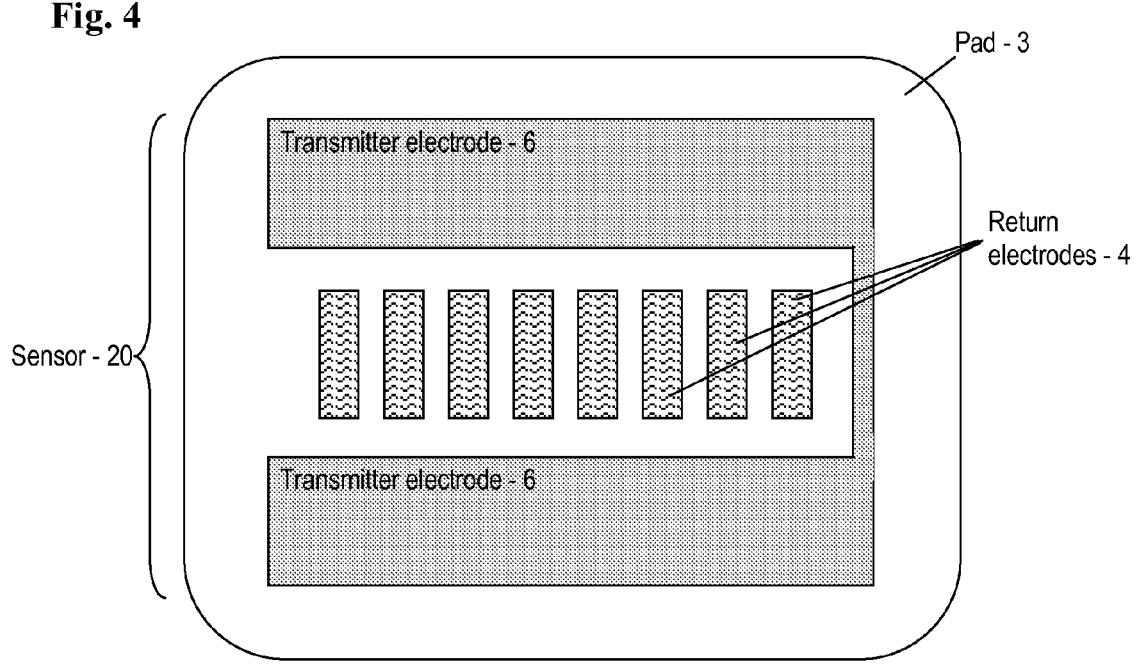

In FIG. 4, the single transmitter electrode 6 may be open (e.g., on one side, such as in an azimuthal direction). FIG. 4 shows a single transmitter electrode 6 may be formed with an open metallic surface. The single transmitter electrode 6 is symmetric in the vertical direction but not in the azimuthal direction. In this case, the image response will be symmetric in the vertical direction but asymmetric in the azimuthal direction (i.e., the responses at equal azimuthal distance to the center point of the return electrodes 4) may be unequal because of the azimuthally asymmetric transmitter electrodes 6.

Figure 5A:
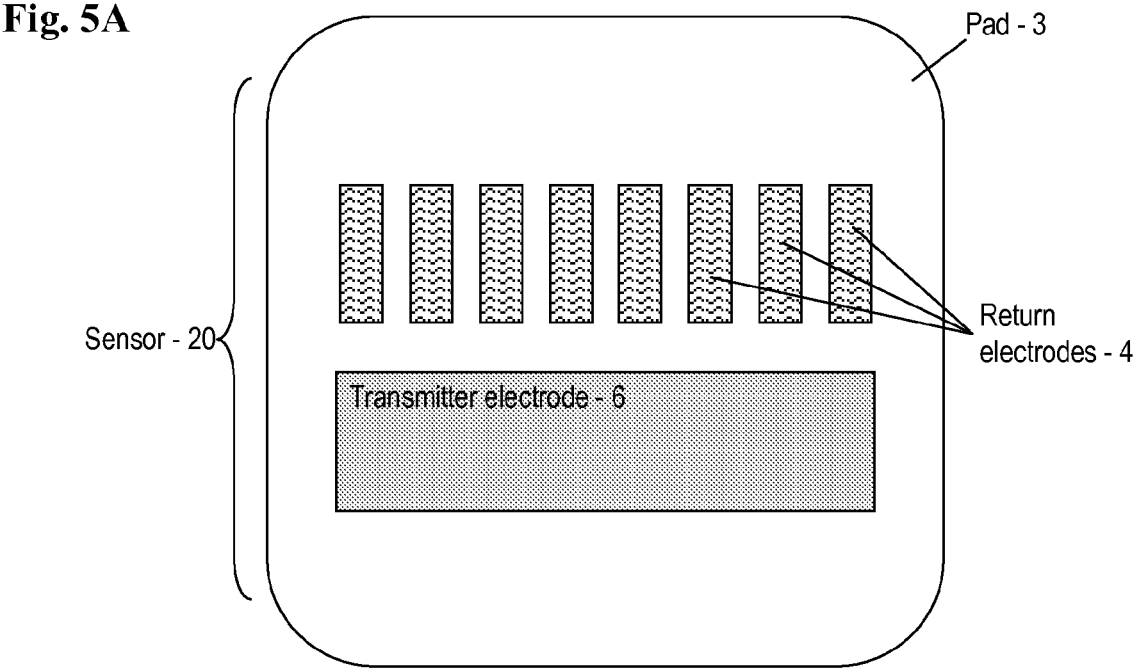
Figure 5B:
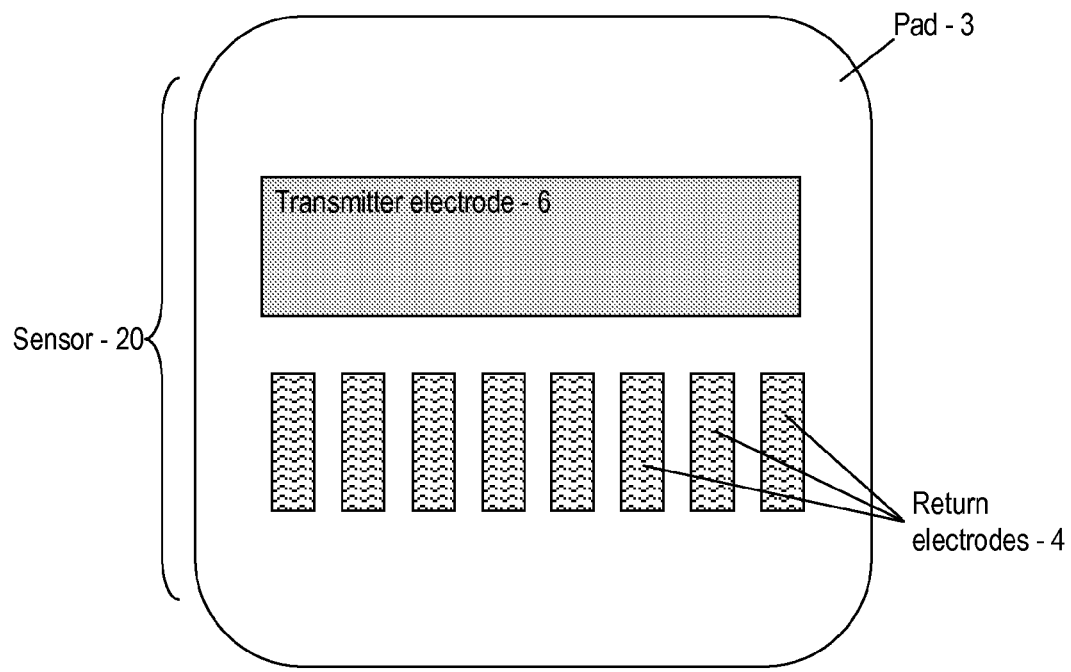

A symmetric image may also be obtained with sensors 20 having a one-side transmitter electrode 6, as shown in FIGS. 5A and 5B, collectively referred to as FIG. 5. In FIG. 5A, a first one-sided transmitter electrode 6 is shown. FIG. 5A depicts the transmitter electrode 6 below the return electrodes 4. FIG. 5B depicts the transmitter electrode 6 above the return electrodes 4. With a one-side transmitter electrode 6, the transmitter electrode may be placed below (FIG. 5A) or above (FIG. 5B) the return electrodes 4. Now, with reference to these embodiments of sensors 20, aspects of sequential imaging are presented.

Figure 6:
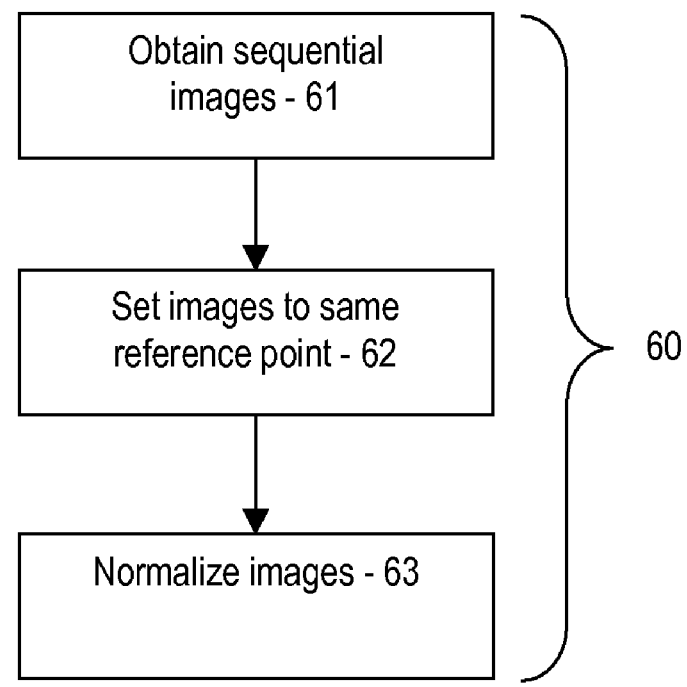
FIG. 6 is a flow chart providing an exemplary method for sequential imaging.

An exemplary method for sequential imaging is provided in FIG. 6. In FIG. 6, the exemplary method for sequential imaging 60 makes use of the sensors 20 depicted in FIG. 5, and begins with a first stage 61. In the first stage 61, images are obtained with both embodiments (FIGS. 5A and 5B). Both images will be asymmetric. In a second stage 62, the two images are depth shifted relative to each other such that the return electrodes 4 of each embodiment are set to the same depth in the wellbore. In a third stage 63, the two images are then processed (such as by evaluating, overlaying, averaging, normalizing, smoothing and by other such techniques) and combined. Accordingly, the processed image will be symmetric in both vertical and azimuthal directions. This mode of image acquisition is generally referred to as "sequential imaging." Sequential imaging may also be implemented with both transmitter electrodes 6 mounted around the same set of return electrodes 4. An example is provided in FIG. 2. In this case, the two transmitter electrodes 6 are activated sequentially. That is, when the upper transmitter electrode 6 is activated, the current emitted from the return electrodes 4 will only migrate to the upper transmitter electrode 6. The lower transmitter electrode 6 is disconnected. In a subsequent measurement, the lower transmitter electrode 6 is used.

Estimation of depth in the wellbore may be accomplished by a variety of techniques as are known in the art. This may include use of various measuring devices, gravimeters, recorders and other such devices. Of course, depth is merely one form of reference point useful for overlapping or orienting a plurality of asymmetric images. Other reference points may found using any type of spatial coordinate system, as well as known points of interest, such as a distinct feature of a formation 10.

It is possible to implement the sequential imaging without the use of two-sided transmitter electrodes (FIG. 2) or combination of one-sided transmitter electrodes (FIG. 5). An exemplary embodiment is provided in FIG. 7.

Figure 7:
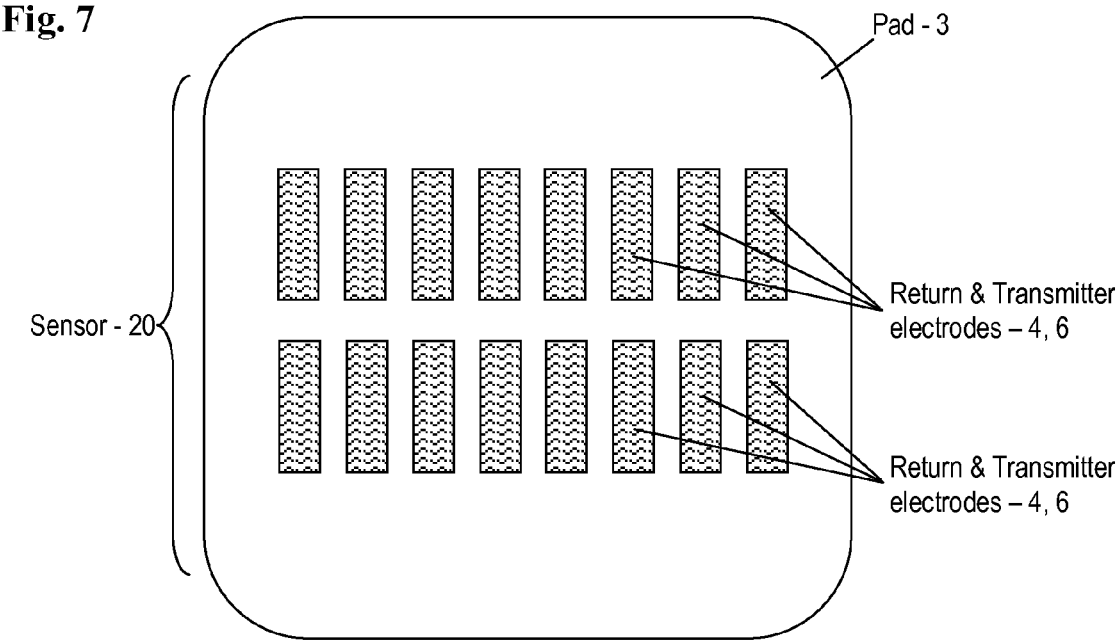
FIGS. 7-8 depict further embodiments of a sensor disposed on a pad.

In FIG. 7, the transmitter electrode 6 is partitioned into smaller electrodes. More specifically, FIG. 7 depicts two asymmetric imaging electrode arrangements from a partitioned transmitter electrode 6. Each and every electrode serves dual functionalities, that of current emission and current return.

When the upper row of electrodes serves as return electrodes 4, the lower row of electrodes is combined to form the transmitter electrode 6. Similarly, when the lower row of electrodes serves as return electrodes 4, the upper row becomes a transmitter electrode 6. By doing so, this effectively provides an embodiment where the two asymmetric arrangements of FIG. 5 are combined into one. Then, by depth shifting and averaging the two asymmetric images, a symmetric image is obtained.

Figure 8:
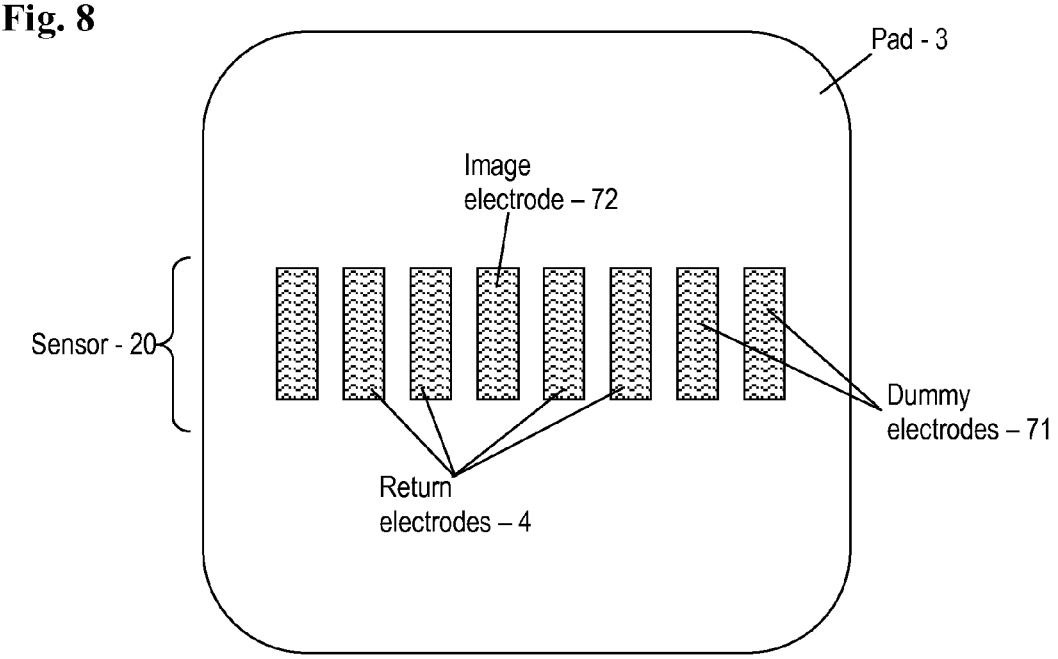

Sequentially imaging may also be implemented with a single row of electrodes. For example, and with reference to FIG. 8, at any time, a single electrode may used as an imaging electrode 72 (i.e., a transmitter electrode 6). Current emitted from the transmitter electrode 6 is returned to return electrode 4 on both sides of the transmitter electrode 6. Remaining electrodes may not be used and are therefore dummy electrodes 71. The process may be repeated for all designated electrodes. Accordingly, very detailed image information may be collected.

In some embodiments, a resistivity instrument 21 includes a computer program product stored on machine readable media, the product including machine executable instructions for performing sequential imaging and operating at least one sensor. Accordingly, the resistivity instrument 21 may include apparatus such as a processor, storage and other analysis components.

As an example, and in support of the teachings herein, various analysis components may be used, including digital and/or an analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), a magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the appended claims.

What is claimed is:

1. A method for providing a symmetric resistivity image of a formation, the method comprising:
   collecting a first asymmetric resistivity image from a first arrangement of electrodes forming an asymmetric sensor;
   collecting a second asymmetric resistivity image from a second arrangement of electrodes forming a second asymmetric sensor the second asymmetric resistivity image overlapping the first asymmetric resistivity image;
   assembling the first and second asymmetric resistivity images about a selected reference point; and
   processing the first and second asymmetric resistivity images to provide a symmetric image of the formation.

2. The method as in claim 1, wherein collecting a first asymmetric resistivity image and collecting a second asymmetric resistivity image comprises simultaneously firing at least one transmitter electrode in the first arrangement of electrodes and at least one transmitter electrode in the second arrangement of electrodes.

3. The method as in claim 1, wherein collecting a first asymmetric resistivity image and collecting a second asymmetric resistivity image comprises sequentially firing at least one transmitter electrode in the first arrangement of electrodes followed by at least one transmitter electrode in the second arrangement of electrodes.

4. The method as in claim 1, wherein collecting a first asymmetric resistivity image and collecting a second asymmetric image resistivity image comprises firing electrodes in the first arrangement of electrodes and in the second arrangement of electrodes having functions of current emission and current return.

5. The method as in claim 1, wherein the selected reference point comprises at least one of a selected depth and a selected point in a spatial coordinate system.

6. The method as in claim 1, wherein assembling comprises orienting each of the images about the reference point according to a symmetry of the sensor.

7. The method as in claim 1, wherein processing comprises at least one of evaluating, overlaying, averaging, normalizing and smoothing each of the images.

8. A non-transitory computer readable medium containing computer instructions stored therein for causing a computer processor to provide a symmetric resistivity image of a formation by implementing a method comprising:
   collecting a first asymmetric resistivity image from a first arrangement of electrodes forming an asymmetric sensor;
   collecting a second asymmetric resistivity image from a second arrangement of electrodes forming a second asymmetric sensor the second asymmetric resistivity image overlapping the first asymmetric resistivity image;
   assembling the first and second asymmetric resistivity images about a selected reference point; and
   processing the first and second asymmetric resistivity images to provide a symmetric image of the formation.

9. The computer readable medium of claim 8, wherein collecting a first asymmetric resistivity image and collecting a second asymmetric image resistivity image comprises simultaneously firing at least one transmitter electrode in the first arrangement of electrodes and at least one transmitter electrode in the second arrangement of electrodes.

10. The computer readable medium of claim 8, wherein collecting a first asymmetric resistivity image and collecting a second asymmetric image resistivity image comprises sequentially firing at least one transmitter electrode in the first arrangement of electrodes followed by at least one transmitter electrode in the second arrangement of electrodes.

11. The computer readable medium of claim 8, wherein collecting a first asymmetric resistivity image and collecting a second asymmetric image resistivity image comprises firing electrodes in the first arrangement of electrodes and in the second arrangement of electrodes having functions of current emission and current return.

12. The computer readable medium of claim 8, wherein the selected reference point comprises at least one of a selected depth and a selected point in a spatial coordinate system.

13. The computer readable medium of claim 8, wherein assembling comprises orienting each of the images about the reference point according to a symmetry of the sensor.

14. The computer readable medium of claim 8, wherein processing comprises at least one of evaluating, overlaying, averaging, normalizing and smoothing each of the images.

15. An instrument for providing a symmetric resistivity image of an earth formation, the instrument comprising:
a non-transitory computer readable medium containing computer instructions stored therein for causing a computer processor to provide the symmetric resistivity image by implementing a method comprising: collecting a first asymmetric resistivity image from a first arrangement of electrodes forming an asymmetric sensor; collecting a second asymmetric resistivity image from a second arrangement of electrodes forming a second asymmetric sensor the second asymmetric resistivity image overlapping the first asymmetric resistivity image; assembling the first and second asymmetric resistivity images about a selected reference point; and processing the first and second asymmetric resistivity images to provide a symmetric image of the formation; and,
at least one computer processor for executing the computer instructions and controlling the first arrangement of electrodes and the second arrangement of electrodes.

16. The instrument as in claim 15, wherein each of the first arrangement of electrodes and the second arrangement of electrodes comprises at least one transmitter electrode disposed next to a plurality of return electrodes.

17. The instrument as in claim 15, wherein each of the first arrangement of electrodes and the second arrangement of electrodes comprises at least one transmitter electrode at least partially surrounding a plurality of return electrodes.

18. The instrument as in claim 15, wherein each of the first arrangement of electrodes and the second arrangement of electrodes comprises a transmitter electrode and a return electrode and wherein the transmitter electrode is configured to serve as the return electrode and the return electrode is configured to serve as the transmitter electrode.

19. The instrument as in claim 18, wherein controlling comprises at least one of simultaneously and sequentially firing the transmitter electrode in the first arrangement of electrodes and the transmitter electrode in the second arrangement of electrodes.

20. The instrument as in claim 15, wherein the first arrangement of electrodes and the second arrangement of electrodes are disposed on a same pad.

21. The instrument as in claim 15, wherein each of the first arrangement of electrodes and the second arrangement of electrodes comprises a transmitter electrode and a return electrode and wherein the transmitter electrode serves as a sensor electrode or the return electrode serves as a sensor electrode.

* * * * *